(12) United States Patent
Lei

(10) Patent No.: US 12,160,476 B2
(45) Date of Patent: Dec. 3, 2024

(54) DATA SHARING METHOD AND APPARATUS APPLIED BETWEEN VEHICLES, MEDIUM, AND ELECTRONIC DEVICE

(71) Applicant: Tencent Technology (Shenzhen) Company Limited, Shenzhen (CN)

(72) Inventor: Yixue Lei, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/202,642

(22) Filed: May 26, 2023

(65) Prior Publication Data
US 2023/0300196 A1 Sep. 21, 2023

Related U.S. Application Data

(63) Continuation of application No. PCT/CN2022/109363, filed on Aug. 1, 2022.

(30) Foreign Application Priority Data

Aug. 2, 2021 (CN) .......................... 202110883167.7

(51) Int. Cl.
H04L 67/12 (2022.01)
(52) U.S. Cl.
CPC .................... H04L 67/12 (2013.01)
(58) Field of Classification Search
CPC .................... H04L 67/12; H04W 4/40
See application file for complete search history.

(56) References Cited

U.S. PATENT DOCUMENTS

| 8,422,464 | B2 | 4/2013 | Friedman et al. |
| 10,863,336 | B2 | 12/2020 | Guo et al. |
| 2016/0345341 | A1* | 11/2016 | Oliver .................. H04W 4/027 |

(Continued)

FOREIGN PATENT DOCUMENTS

| CN | 101646077 A | 2/2010 |
| CN | 102595485 A | 7/2012 |

(Continued)

OTHER PUBLICATIONS

International Search Report and Written Opinion for PCT/CN2022/109363 mailed Oct. 17, 2022 including translation of Search Report and Written Opinion (12 pages).

(Continued)

Primary Examiner — Jimmy H Tran
(74) Attorney, Agent, or Firm — Crowell & Moring LLP

(57) ABSTRACT

Embodiments of this application provide a data sharing method and apparatus applied between vehicles, a medium, and an electronic device. The data sharing method applied between vehicles includes: obtaining communication quality of a data sharing link between a first vehicle and a second vehicle; selecting, according to the communication quality, a sensor data level that matches the communication quality, the sensor data level being determined by a first parameter in at least one of the following dimensions of sensor data: quality of the sensor data and quantity of the sensor data; and sharing, according to the selected sensor data level by using the data sharing link, sensor data corresponding to the sensor data level with the second vehicle.

19 Claims, 5 Drawing Sheets

(56) References Cited

U.S. PATENT DOCUMENTS

| | | | |
|---|---|---|---|
| 2018/0077518 A1* | 3/2018 | Nguyen | H04W 4/06 |
| 2018/0206280 A1* | 7/2018 | Kasparick | H04B 17/309 |
| 2018/0235022 A1* | 8/2018 | Wu | H04L 45/302 |
| 2018/0261020 A1 | 9/2018 | Petousis et al. | |
| 2019/0041225 A1* | 2/2019 | Winkle | H04W 48/16 |
| 2019/0075436 A1* | 3/2019 | Yukizaki | H04W 4/80 |
| 2019/0098470 A1* | 3/2019 | Yukizaki | H04W 4/46 |
| 2019/0130754 A1* | 5/2019 | Mueck | G08G 1/163 |
| 2019/0158992 A1* | 5/2019 | Lee | H04W 28/0226 |
| 2019/0174286 A1* | 6/2019 | Guo | H04W 72/02 |
| 2019/0245647 A1* | 8/2019 | Alieiev | H04L 1/0017 |
| 2020/0077278 A1* | 3/2020 | Jornod | H04W 16/18 |
| 2020/0120458 A1* | 4/2020 | Aldana | H04W 36/0088 |
| 2020/0145799 A1* | 5/2020 | Baghel | H04L 1/0018 |
| 2020/0229171 A1* | 7/2020 | Khoryaev | H04W 4/40 |
| 2020/0260333 A1* | 8/2020 | Kousaridas | H04W 4/40 |
| 2020/0267572 A1* | 8/2020 | Pfadler | H04B 7/086 |
| 2020/0267573 A1* | 8/2020 | Pfadler | H04W 4/44 |
| 2020/0280827 A1* | 9/2020 | Fechtel | H04W 80/02 |
| 2020/0351906 A1* | 11/2020 | Chen | H04W 8/22 |
| 2020/0367250 A1* | 11/2020 | Tang | H04W 72/0473 |
| 2020/0380872 A1* | 12/2020 | Hong | G08G 5/0013 |
| 2021/0074165 A1* | 3/2021 | Pfadler | B60W 30/165 |
| 2021/0082210 A1* | 3/2021 | Sakr | G07C 5/008 |
| 2021/0235305 A1* | 7/2021 | Lu | H04W 4/06 |
| 2021/0274387 A1* | 9/2021 | Kousaridas | H04L 43/091 |
| 2021/0289572 A1* | 9/2021 | Deng | H04W 28/24 |
| 2021/0321255 A1* | 10/2021 | Faccin | H04W 28/065 |
| 2021/0329487 A1* | 10/2021 | Wang | H04W 28/24 |
| 2021/0360542 A1* | 11/2021 | Gao | H04W 4/40 |
| 2021/0377707 A1* | 12/2021 | Pfadler | H04W 4/40 |
| 2021/0385693 A1* | 12/2021 | Wang | H04W 28/24 |
| 2022/0286977 A1* | 9/2022 | Yang | H04W 52/24 |
| 2022/0295336 A1* | 9/2022 | Rao | H04W 4/44 |
| 2022/0346118 A1* | 10/2022 | Wu | H04L 1/1825 |
| 2023/0037030 A1* | 2/2023 | Lee | H04L 5/0053 |
| 2023/0038372 A1* | 2/2023 | Yu | G05D 1/0293 |
| 2023/0180041 A1* | 6/2023 | Vassilovski | H04W 28/0289 370/229 |
| 2023/0208604 A1* | 6/2023 | Chang | H04L 1/1812 370/329 |
| 2023/0237914 A1* | 7/2023 | Vassilovski | H04W 4/023 701/23 |
| 2023/0247399 A1* | 8/2023 | Lu | G01S 17/87 709/224 |
| 2024/0314529 A1* | 9/2024 | Moustafa | H04L 67/51 |

FOREIGN PATENT DOCUMENTS

| | | |
|---|---|---|
| CN | 107070811 A | 8/2017 |
| CN | 109246655 A | 1/2019 |
| CN | 109358612 A | 2/2019 |
| CN | 110225291 A | 9/2019 |
| CN | 110754074 A | 2/2020 |
| CN | 110868373 A | 3/2020 |
| CN | 112333414 A | 2/2021 |
| CN | 113066289 A | 7/2021 |
| CN | 113613201 A | 11/2021 |

OTHER PUBLICATIONS

Office Action issued in Chinese Patent Application No. 202110883167.7 dated Sep. 21, 2024, w/English translation, 32 pages.

* cited by examiner

DATA SHARING METHOD AND APPARATUS APPLIED BETWEEN VEHICLES, MEDIUM, AND ELECTRONIC DEVICE

RELATED APPLICATION

This application is a continuation of International Application No. PCT/CN2022/109363, filed Aug. 1, 2022, which claims priority to Chinese Patent Application No. 202110883167.7, filed with the China National Intellectual Property Administration on Aug. 2, 2021 and entitled "DATA SHARING METHOD AND APPARATUS APPLIED BETWEEN VEHICLES, MEDIUM, AND ELECTRONIC DEVICE". The contents of International Application No. PCT/CN2022/109363 and Chinese Patent Application No. 202110883167.7 are each incorporated herein by reference in their entirety.

FIELD OF THE TECHNOLOGY

This application relates to the field of computers and communication technologies, and specifically, to a data sharing method and apparatus applied between vehicles, a medium, and an electronic device.

BACKGROUND OF THE DISCLOSURE

In an application scenario of vehicle communication, sensor data may be shared between vehicles. Specifically, a vehicle and a road side unit (RSU) may detect, by using sensors (such as a camera and a radar) configured by them, information about another traffic participant (such as a vehicle, a pedestrian, and a rider) or an abnormal road condition, such as a road traffic incident (such as a traffic accident), an abnormal vehicle behavior (such as speeding, leaving a lane, traveling on the wrong side of the road, unconventional driving, and abnormal quiescence), a road obstacle (such as a falling stone, a scattered object, and a dead branch), and a road condition (such as water or ice), and transmit the detected information after processing to another surrounding vehicle by using vehicle to everything (V2X) communication. The other vehicle that receives the information may perceive, in advance, a traffic participant or an abnormal road condition that is not within a field of view of the vehicle, which assists the vehicle in making a correct driving decision, so as to reduce a traffic accident and secondary injury, and improve driving safety or traffic efficiency.

SUMMARY

Other features and advantages of this application may become apparent through the following detailed descriptions or partially learned through the practice of this application.

According to an embodiment of this application, a data sharing method applied between vehicles is provided, and is performed by a first vehicle, including: obtaining communication quality of a data sharing link between the first vehicle and a second vehicle; selecting, according to the communication quality, a sensor data level that matches the communication quality, the sensor data level being determined by a first parameter in at least one of the following dimensions of sensor data: quality of the sensor data and quantity of the sensor data; and sharing, according to the selected sensor data level by using the data sharing link, sensor data corresponding to the sensor data level with the second vehicle.

According to an embodiment of this application, a data sharing apparatus applied between vehicles is provided, including: an obtaining unit, configured to obtain communication quality of a data sharing link between a first vehicle and a second vehicle; a selection unit, configured to select, according to the communication quality, a sensor data level that matches the communication quality, the sensor data level being determined by a first parameter in at least one of the following dimensions of sensor data: quality of the sensor data and quantity of the sensor data; and a transmission unit, configured to share, according to the selected sensor data level by using the data sharing link, sensor data corresponding to the sensor data level with the second vehicle.

According to an aspect of the embodiments of this application, a computer readable medium is provided, storing a computer program, the computer program, when executed by a processor, implementing the data sharing method applied between vehicles according to the foregoing embodiment.

According to an aspect of the embodiments of this application, an electronic device is provided, including: one or more processors; and a storage apparatus, configured to store one or more programs, and when the one or more programs are executed by the one or more processors, the electronic device is enabled to implement the data sharing method applied between vehicles in the foregoing embodiment.

According to an aspect of the embodiments of this application, a computer program product or a computer program is provided, the computer program product or the computer program including computer instructions, the computer instructions being stored in a computer readable storage medium. A processor of a computer device reads the computer instructions from the computer readable storage medium, and the processor executes the computer instructions, so that the computer device performs the data sharing method applied between vehicles provided in the foregoing various embodiments.

It is to be understood that the foregoing general descriptions and the following detailed descriptions are only examples and are explanatory, and do not limit this application.

BRIEF DESCRIPTION OF THE DRAWINGS

The accompanying drawings herein are incorporated into the specification and constitute a part of the specification, illustrate embodiments that conform to this application, and are used together with the specification to explain the principles of this application. The accompanying drawings described below are merely some embodiments of this application, and a person of ordinary skill in the art may further obtain other accompanying drawings according to the accompanying drawings without creative efforts. In the accompanying drawings.

DESCRIPTION OF EMBODIMENTS

Example implementations are now described in a more comprehensive manner with reference to the accompanying drawings. However, the example implementations can be implemented in various forms and are not to be construed as limited to these examples. On the contrary, the purpose of providing these implementations is to make this application more comprehensive and complete, and convey the concept of the example implementations to a person skilled in the art in a comprehensive manner.

In addition, the described features, structures or characteristics in this application may be combined in one or more embodiments in any appropriate manner. The following description has many specific details, so that the embodiments of this application can be fully understood. However, a person skilled in the art is to realize that during implementing of the technical solutions of this application, not all the detailed features in the embodiments may be required, and one or more specific details may be omitted, or another method, element, apparatus, step, or the like may be used.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

"Plurality of" mentioned in the specification means two or more. "And/or" describes an association relationship of an associated object, indicating that three relationships may exist. For example, A and/or B may indicate three cases: A exists alone, both A and B exist, and B exist alone. The character "/" generally indicates an "or" relationship between associated objects before and after the character.

In the related art, there is a relatively low efficiency problem when sensor data is shared between vehicles, which further affects driving safety of the vehicles.

Embodiments of this application provide a data sharing method applied between vehicles, so as to flexibly adjust shared sensor data according to different link communication quality at least to a certain extent, and further cope with a complex and dynamic vehicle communication environment, thereby improving efficiency of sharing sensor data between vehicles, and ensuring driving safety.

Figure 1:
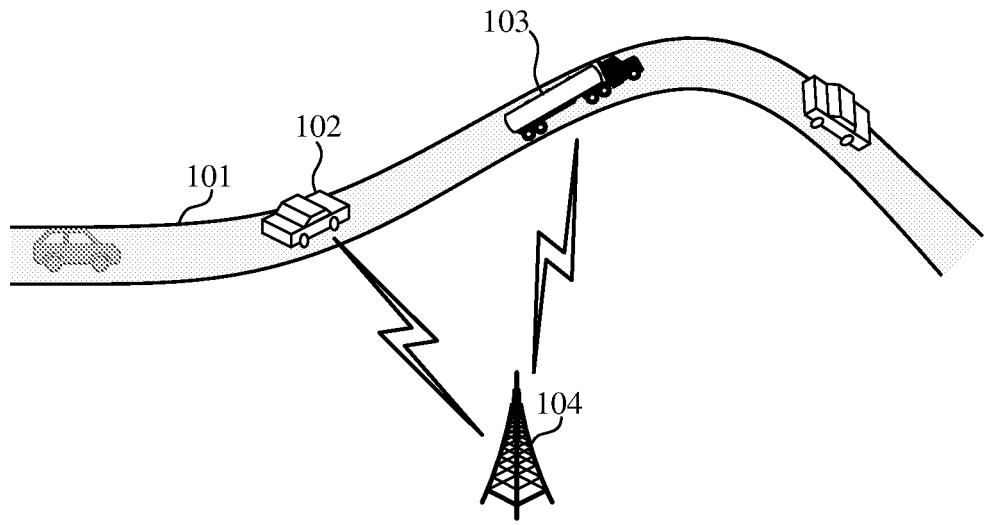
FIG. 1 is a schematic diagram of an application scenario according to an embodiment of this application.

FIG. 1 is a schematic diagram of an application scenario to which a data sharing method applied between vehicles is applied according to an embodiment of this application.

In the application scenario shown in FIG. 1, multiple vehicles travel on a road 101, and sensors such as a laser sensor, a vision sensor, a speed sensor, an acceleration sensor, a position sensor, and a radar are installed on the vehicle. Sensor data may be shared between vehicles, for example, data measured by a laser sensor, image data detected by a vision sensor, speed data detected by a speed sensor, acceleration data detected by an acceleration sensor, position data detected by a position sensor, detection data of a radar, and the like may be shared between vehicles to share the sensor data.

In some embodiments, sensor data may be shared between vehicles by using a PC5 link, or may be shared by using Uu communication. For example, as shown in FIG. 1, a vehicle 102 and a vehicle 103 may separately establish communication connections with a base station 104, and then the vehicle 102 and the vehicle 103 may share sensor data by using the base station 104. That is, the vehicle 102 may transmit sensor data that needs to be shared to the base station 104, and then the base station 104 forwards the sensor data to the vehicle 103. Alternatively, the sensor data may be directly shared and processed between the vehicle 102 and the vehicle 103 by using a PC5 link. Internet of Vehicles communication supports information exchange between a vehicle and any thing (V2X). The V2X communication mode includes communication interaction of vehicle to vehicle (V2V), vehicle to pedestrian (V2P), vehicle to infrastructure (V2I), and vehicle to network (V2N). The V2X communication mode includes two communication interfaces: PC5 and Uu. PC5 may also be referred to as a direct communication interface, and is a short-range direct communication interface among a vehicle, a person, and a road infrastructure. Uu is also referred to as a cellular network communication interface and is a communication interface between a terminal and a base station.

In an embodiment of this application, the vehicle 102 may further obtain communication quality of a data sharing link (for example, a PC5 link or a Uu communication link) between the vehicle 102 and the vehicle 103, and then select a matched sensor data level according to the communication quality, so as to share sensor data with the vehicle 103 according to the selected sensor data level by using the data sharing link. The sensor data level is used for representing quality of the sensor data and/or a quantity of the sensor data.

Specifically, if the communication quality of the data sharing link between the vehicle 102 and the vehicle 103 is relatively poor, sensor data with relatively high importance may be preferentially transmitted, and a data volume of the shared sensor data is reduced. When the communication quality of the data sharing link between the vehicle 102 and the vehicle 103 is relatively high, sharing frequency of the sensor data may be increased, and the data volume of the shared sensor data may be properly increased.

It can be learned that, according to the technical solution in this embodiment of this application, during sensor data sharing, communication quality of a data sharing link may be considered between vehicles, so as to adjust quality of the shared sensor data and/or a quantity of the shared sensor data. Therefore, an objective of flexibly adjusting the shared sensor data according to different link communication quality at least to a certain extent is achieved, further coping with a complex and dynamic vehicle communication environment, thereby improving efficiency of sharing sensor data between vehicles, and ensuring driving safety.

Figure 2:
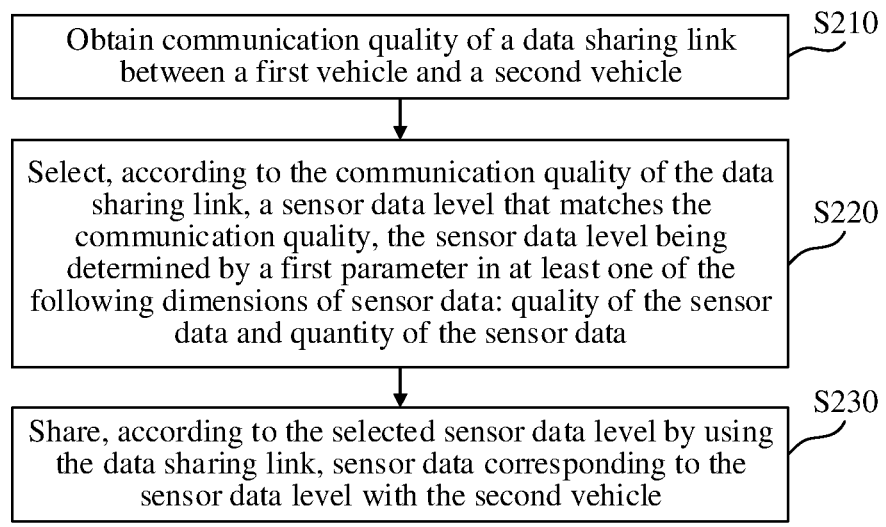
FIG. 2 is a flowchart of a data sharing method applied between vehicles according to an embodiment of this application.

The implementation details of the technical solution of this embodiment of this application are described in detail in the following:

FIG. 2 is a flowchart of a data sharing method applied between vehicles according to an embodiment of this application. The data sharing method applied between vehicles may be performed by a vehicle. Referring to FIG. 2, the data sharing method applied between vehicles includes at least step S210 to step S230. Details are described as follows:

Step S210: Obtain communication quality of a data sharing link between a first vehicle and a second vehicle.

In an embodiment of this application, the data sharing link between the first vehicle and the second vehicle may be a PC5 communication link between the first vehicle and the second vehicle, or may be a Uu communication link between the first vehicle and the second vehicle.

In some embodiments, the communication quality of the data sharing link between the first vehicle and the second vehicle may be monitored communication quality of the data sharing link between the first vehicle and the second vehicle; or may be predicted communication quality of the data sharing link between the first vehicle and the second vehicle.

In an embodiment of this application, a process of obtaining the communication quality of the data sharing link between the first vehicle and the second vehicle may be: obtaining an impact parameter of the communication quality of the data sharing link, and performing fitting processing on the obtained impact parameter to obtain a network quality level, the network quality level being used for indicating the communication quality of the data sharing link. According to the technical solution of this embodiment, a network quality level can be obtained by comprehensively fitting parameters that affect communication quality.

In an embodiment of this application, if the first vehicle communicates with the second vehicle by using a PC5 communication resource pool mode, the impact parameter of the communication quality of the data sharing link includes at least one of the following: communication capabilities of the first vehicle and the second vehicle, a communication frequency band that can be used between the first vehicle and the second vehicle, an interference degree of the data sharing link, and a vehicle distance between the first vehicle and the second vehicle. The PC5 communication resource pool mode means that a resource (including a frequency domain resource, a time domain resource, and the like) for PC5 communication is pre-allocated, and when the first vehicle communicates with the second vehicle, a communication resource is selected from the pre-allocated resource to perform communication.

In some embodiments, the communication capabilities of the first vehicle and the second vehicle include a communication manner (for example, whether PC5 communication is supported) that can be supported by the first vehicle and the second vehicle, whether receive and transmit capabilities are provided, and the like. The communication frequency band that can be used between the first vehicle and the second vehicle is a frequency bandwidth that is in a communication resource pool allocated to the first vehicle and the second vehicle. The interference degree of the data sharing link is used for indicating a communication situation after another vehicle or device interferes with the first vehicle and the second vehicle, for example, may be measured by using vehicle density.

In an embodiment of this application, if the first vehicle communicates with the second vehicle by using a PC5 resource scheduling mode, the impact parameter of the communication quality of the data sharing link includes at least one of the following: communication capabilities of the first vehicle and the second vehicle, a communication frequency band that can be used between the first vehicle and the second vehicle, an interference degree of the data sharing link, a vehicle distance between the first vehicle and the second vehicle, quality monitoring information of a PC5 communication link, and quality prediction information of the PC5 communication link. The PC5 resource scheduling mode means that a scheduling device (for example, a base station) allocates a communication resource to the first vehicle and the second vehicle in a PC5 resource scheduling manner.

In some embodiments, the communication capabilities of the first vehicle and the second vehicle include a communication manner (for example, whether PC5 communication is supported) that can be supported by the first vehicle and the second vehicle, whether receive and transmit capabilities are provided, and the like. The communication frequency band that can be used between the first vehicle and the second vehicle is a communication frequency bandwidth allocated to the first vehicle and the second vehicle when the first vehicle is scheduled to communicate with the second vehicle, so that the first vehicle and the second vehicle use the communication frequency bandwidth. The interference degree of the data sharing link is used for indicating a communication situation after another vehicle or device interferes with the first vehicle and the second vehicle. The quality monitoring information of the PC5 communication link indicates link quality obtained by monitoring a sidelink. The quality prediction information of the PC5 communication link indicates predicted link quality of the sidelink.

In an embodiment of this application, if the first vehicle communicates with the second vehicle by using a mobile communication network, the impact parameter of the communication quality of the data sharing link includes at least one of the following: communication link quality monitoring information on a radio access network side, communication link quality prediction information on the radio access network side, communication link quality monitoring information on a core network side, and communication link quality prediction information on the core network side.

In some embodiments, the communication link quality monitoring information on the radio access network side includes uplink quality monitoring information and downlink quality monitoring information on the radio access network side. The communication link quality prediction information on the radio access network side includes uplink quality prediction information and downlink quality prediction information on the radio access network side. The communication link quality monitoring information on the core network side includes uplink quality monitoring information and downlink quality monitoring information on the core network side. The communication link quality prediction information on the core network side includes uplink quality prediction information and downlink quality prediction information on the core network side.

In an embodiment of this application, if the impact parameter of the communication quality of the data sharing link includes the communication capabilities of the first vehicle and the second vehicle, the network quality level is in a positive correlation with the communication capability.

That is, stronger communication capabilities of the first vehicle and the second vehicle indicate a higher network quality level. Conversely, weaker communication capabilities of the first vehicle and the second vehicle indicate a lower network quality level.

In an embodiment of this application, if the impact parameter of the communication quality of the data sharing link includes the communication frequency band that can be used between the first vehicle and the second vehicle, the network quality level is in a positive correlation with a bandwidth of the communication frequency band. That is, a wider communication frequency band that can be used between the first vehicle and the second vehicle indicates a higher network quality level. Conversely, a narrower communication frequency band that can be used between the first vehicle and the second vehicle indicates a lower network quality level.

In an embodiment of this application, if the impact parameter of the communication quality of the data sharing link includes the interference degree of the data sharing link, the network quality level is in an inverse correlation with the interference degree. That is, a higher interference degree of the data sharing link between the first vehicle and the second vehicle indicates a lower network quality level. Conversely, a lower interference degree of the data sharing link between the first vehicle and the second vehicle indicates a higher network quality level.

In an embodiment of this application, if the impact parameter of the communication quality of the data sharing link includes the vehicle distance between the first vehicle and the second vehicle, the network quality level is in an inverse correlation with the vehicle distance. That is, a larger vehicle distance between the first vehicle and the second vehicle indicates a lower network quality level. Conversely, a shorter vehicle distance between the first vehicle and the second vehicle indicates a higher network quality level.

Still referring to FIG. 2, in step S220, select, according to the communication quality of the data sharing link, a sensor data level that matches the communication quality, the sensor data level being determined by a first parameter in at least one of the following dimensions of sensor data: quality of the sensor data and quantity of the sensor data.

In some embodiments, if the communication quality of the data sharing link is relatively high, higher-level sensor data may be selected; and if the communication quality of the data sharing link is relatively poor, lower-level sensor data may be selected.

In some embodiments, the first parameter in the dimension corresponding to the quality of the sensor data includes at least one of the following factors: content importance of the sensor data, precision of the sensor data, and an information format of the sensor data; and the first parameter in the dimension corresponding to the quantity of sensor data includes: sharing frequency of the sensor data.

In some embodiments, the higher-level sensor data may represent at least one of the following: The sensor data has relatively high quality (for example, has relatively high precision and relatively high importance), or the quantity of sensor data is relatively large (which may be specifically represented by sharing frequency; for example, higher sharing frequency indicates a relatively large quantity of sensor data). Conversely, the lower-level sensor data may represent at least one of the following: The sensor data has relatively poor quality (for example, has relatively low precision and relatively low importance), or the quantity of sensor data is relatively small (which may be specifically represented by sharing frequency; for example, lower sharing frequency indicates a relatively small quantity of sensor data).

In an embodiment of this application, before the sensor data level that matches the communication quality is selected according to the communication quality, a plurality of sensor data levels may be generated according to the first parameter in at least one dimension of the quality of the sensor data and the quantity of the sensor data, dimension categories corresponding to different sensor data levels being not exactly the same as the first parameters in the dimensions. For example, fitting processing may be performed on the first parameter in the at least one dimension by using a linear operation, to obtain the sensor data level.

Step S230: Share, according to the selected sensor data level by using the data sharing link, sensor data corresponding to the sensor data level with the second vehicle.

According to the technical solution in the embodiment shown in FIG. 2, during sensor data sharing, communication quality of a data sharing link may be considered between vehicles, so as to adjust quality of the shared sensor data and/or a quantity of the shared sensor data. Therefore, an objective of flexibly adjusting the shared sensor data according to different link communication quality at least to a certain extent is achieved, further coping with a complex and dynamic vehicle communication environment, thereby improving efficiency of sharing sensor data between vehicles, and ensuring driving safety.

Figure 3:
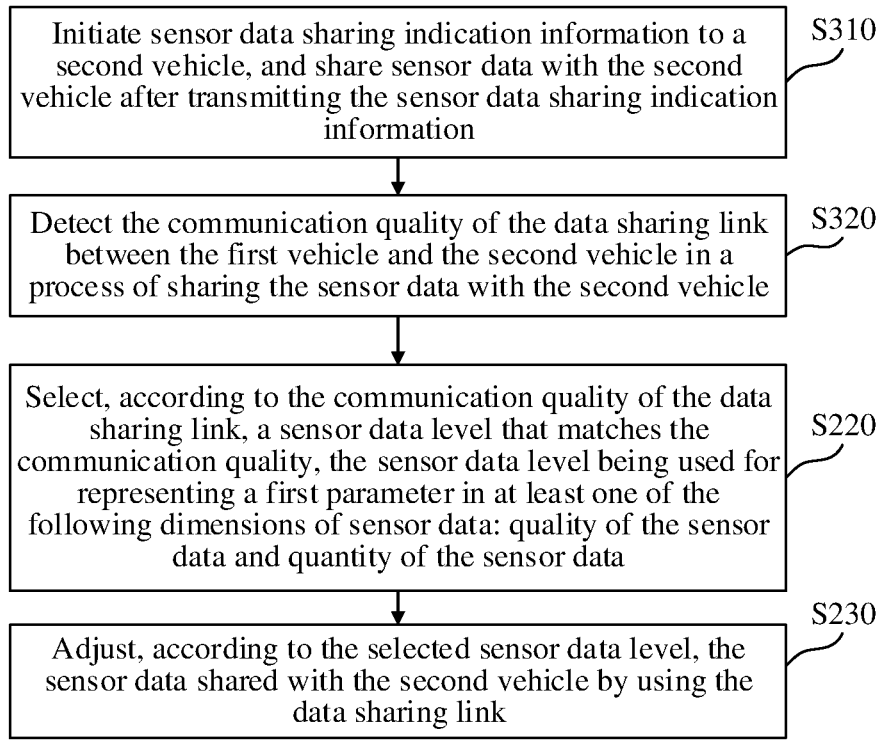
FIG. 3 is a flowchart of a data sharing method applied between vehicles according to an embodiment of this application.

FIG. 3 is a flowchart of a data sharing method applied between vehicles according to an embodiment of this application. The data sharing method applied between vehicles may be performed by a vehicle. Referring to FIG. 3, the data sharing method applied between vehicles includes at least step S310 and step S320, and step S220 and step S230 shown in FIG. 2. Details are described as follows:

Step S310: A first vehicle initiates sensor data sharing indication information to a second vehicle, and shares sensor data with the second vehicle after transmitting the sensor data sharing indication information.

That is, the first vehicle may actively initiate a sensor data sharing process to the second vehicle, and after initiating the active sharing process, share the sensor data with the second vehicle.

Step S320: Detect communication quality of a data sharing link between the first vehicle and the second vehicle in a process of sharing the sensor data with the second vehicle.

In some embodiments, the data sharing link between the first vehicle and the second vehicle may be a PC5 communication link between the first vehicle and the second vehicle, or may be a Uu communication link between the first vehicle and the second vehicle.

In some embodiments, a process of detecting the communication quality of the data sharing link between the first vehicle and the second vehicle may be: obtaining an impact parameter (which may also be referred to as a second parameter) of the communication quality of the data sharing link, and performing fitting processing on the obtained impact parameter to obtain a network quality level, the network quality level being used for indicating the communication quality of the data sharing link. According to the technical solution of this embodiment, a network quality level can be obtained by comprehensively fitting parameters that affect communication quality.

After step S320, step S220 and step S230 in FIG. 2 may be performed, as described above.

In the embodiment shown in FIG. 3, because sharing and processing of the sensor data have been performed, after the sensor data level that matches the communication quality of the data sharing link between the vehicles is selected, the sensor data shared with the second vehicle by using the data sharing link may be adjusted according to the selected sensor data level.

Figure 4:
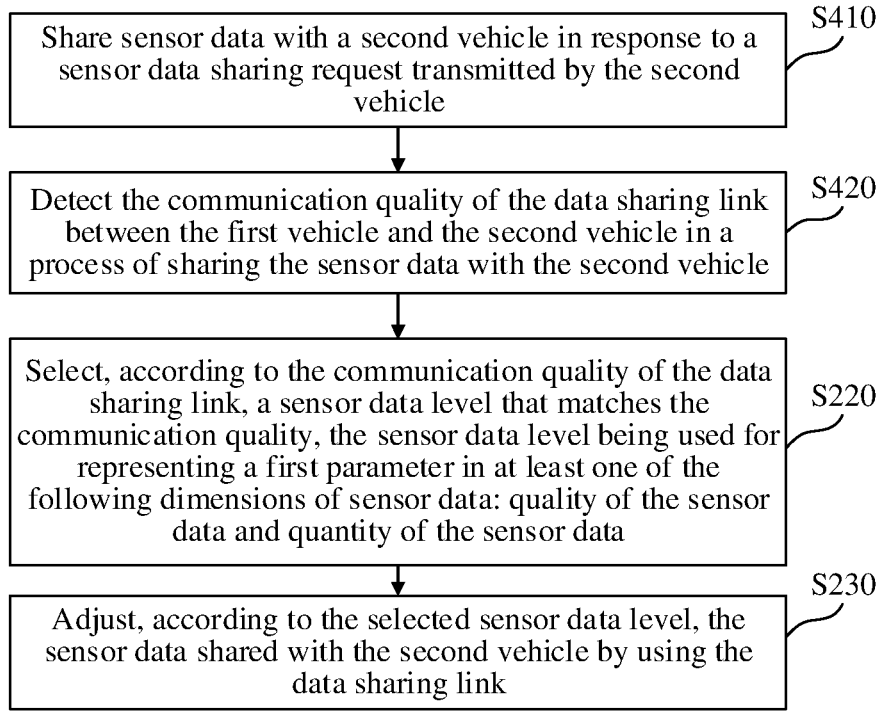
FIG. 4 is a flowchart of a data sharing method applied between vehicles according to an embodiment of this application.

FIG. 4 is a flowchart of a data sharing method applied between vehicles according to an embodiment of this application. The data sharing method applied between vehicles may be performed by a vehicle. Referring to FIG. 4, the data sharing method applied between vehicles includes at least step S410 and step S420, and step S220 and step S230 shown in FIG. 2. Details are described as follows:

Step S410: Share sensor data with a second vehicle in response to a sensor data sharing request transmitted by the second vehicle.

That is, after receiving the sensor data sharing request transmitted by the second vehicle, a first vehicle may share the sensor data with the second vehicle.

Step S420: Detect communication quality of a data sharing link between a first vehicle and the second vehicle in a process of sharing the sensor data with the second vehicle.

In some embodiments, the data sharing link between the first vehicle and the second vehicle may be a PC5 communication link between the first vehicle and the second vehicle, or may be a Uu communication link between the first vehicle and the second vehicle.

In some embodiments, a process of detecting the communication quality of the data sharing link between the first vehicle and the second vehicle may be: obtaining an impact parameter of the communication quality of the data sharing link, and performing fitting processing on the obtained impact parameter to obtain a network quality level, the network quality level being used for indicating the communication quality of the data sharing link. According to the technical solution of this embodiment, a network quality level can be obtained by comprehensively fitting parameters that affect communication quality.

After step S420, step S220 and step S230 in FIG. 2 may be performed. For a specific process, refer to the technical solutions in the foregoing embodiment, and details are not described again.

In the embodiment shown in FIG. 4, because sharing and processing of the sensor data have been performed, after the sensor data level that matches the communication quality of the data sharing link between the vehicles is selected, the sensor data shared with the second vehicle by using the data sharing link may be adjusted according to the selected sensor data level.

Figure 5:
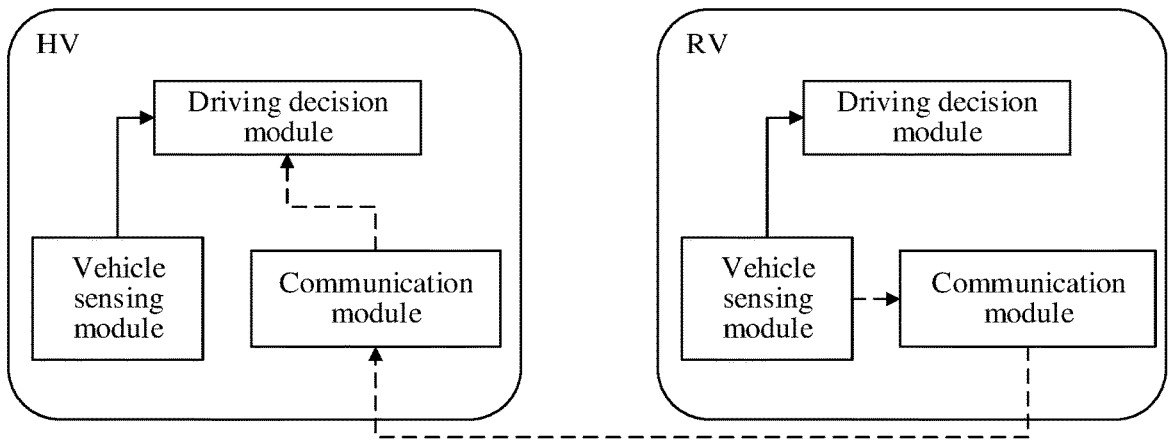
FIG. 5 is a block diagram of a data sharing system between vehicles according to an embodiment of this application.

FIG. 5 is a block diagram of a data sharing system between vehicles according to an embodiment of this application. In FIG. 5, HV represents a host vehicle, and RV represents a remote vehicle. Both HV and RV have a driving decision module, a vehicle sensing module, and a communication module. The vehicle sensing module includes a plurality of sensors, such as a laser sensor, a vision sensor, a speed sensor, an acceleration sensor, a position sensor, and a radar. The driving decision module is configured to obtain sensor data from the vehicle sensing module of the vehicle itself, or may obtain sensor data shared by another vehicle based on the communication module, and the data is used for supporting the vehicle in making driving decisions, such as forward collision warning (FCW), driver fatigue warning (DFW), tire pressure monitoring (TPMS), or the like, or may perform lane keeping assist (LKA), automated parking assistance (APS), autonomous emergency braking (AEB), adaptive cruise control (ACC), or the like.

In some embodiments, the vehicle may make a driving decision by using an artificial intelligence technology. The AI technology involves a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

In addition, the AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

Computer vision (CV) is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multidimensional data. The computer vision technology generally includes technologies such as image processing, image recognition, image semantic understanding, image retrieval, optical character recognition (OCR), video processing, video semantic understanding, video content/behavior recognition, 3D object reconstruction, 3D technology, virtual reality, augmented reality, synchronous locating, and map construction, and further includes a common biometric feature recognition technology such as face recognition and fingerprint recognition.

Still referring to FIG. 5, the communication module includes at least one of a PC5 communication module and a Uu communication module (for example, 4G or 5G Uu communication). For example, the communication module may support Long Term Evolution-Vehicle (LTE-V) communication, NR-V communication, or ETC-X communication. In the embodiment shown in FIG. 5, the driving decision module included in the HV may obtain the sensor data based on the vehicle sensing module of the HV, or may obtain, based on the communication module, the sensor data shared by the RV, so as to make a driving decision.

Figure 6:
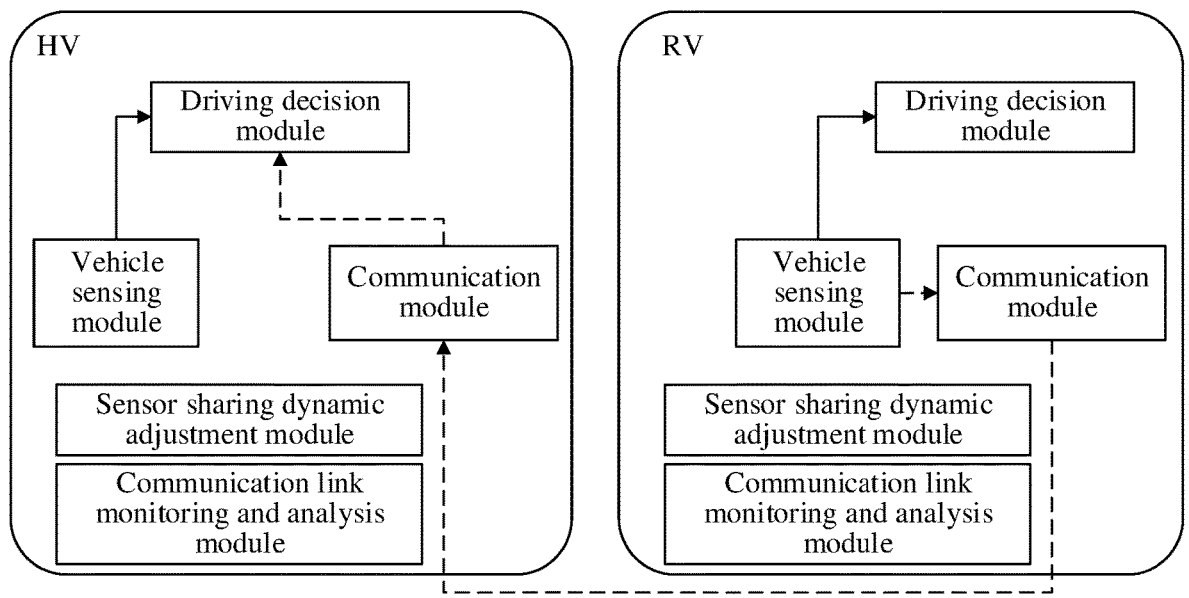
FIG. 6 is a block diagram of a data sharing system between vehicles according to an embodiment of this application.

Because the communication link between the HV and the RV is changeable, if a case of the communication link is not considered, a problem of relatively low efficiency exists when the sensor data is shared between the HV and the RV, which further affects driving safety of the vehicle. Based on this, in a data sharing system shown in FIG. 6, a sensor sharing dynamic adjustment module and a communication link monitoring and analysis module are introduced into a vehicle.

The sensor sharing dynamic adjustment module is configured to adjust, according to communication link quality (a real-time measured value or a predicted value) between vehicles, content and frequency of sensor data shared between vehicles. The communication link monitoring and analysis module is configured to monitor communication quality of a wireless link that performs sensor data sharing between vehicles. In some embodiments, in the embodiment shown in FIG. 6, the communication link monitoring and analysis module included in the RV is configured to monitor communication quality of a radio link that performs sensor data sharing between the HV and the RV, and the sensor sharing dynamic adjustment module included in the RV is configured to adjust, according to the communication link quality between vehicles, content and frequency of the sensor data shared by the RV with the HV.

In some embodiments, the communication link monitoring and analysis module may evaluate quality of a communication link used for sensor data sharing between vehicles in the following manner.

In an embodiment of this application, if communication is performed between vehicles in a PC5 resource pool mode, quality of a communication link used for sensor data sharing may be obtained by evaluating the following factors (that is, the second parameter): communication capabilities of a transmit end vehicle and a receive end vehicle, a frequency bandwidth allocated to vehicle communication, a situation of interference to vehicle communication (for example, may be measured by using vehicle density), and a distance between vehicles.

In an embodiment of this application, if communication is performed between vehicles in a PC5 scheduling mode, quality of a communication link used for sensor data sharing may be obtained by evaluating the following factors (that is, the second parameter): communication capabilities of a transmit end vehicle and a receive end vehicle, a frequency bandwidth allocated to vehicle communication, a situation of interference to vehicle communication (for example, may be measured by using vehicle density), a quality monitoring and/or prediction situation of a PC5 link, and a distance between vehicles.

In an embodiment of this application, if communication is performed between vehicles in a Uu mode, quality of a communication link used for sensor data sharing may be obtained by evaluating the following factors (that is, the second parameter): an uplink and/or downlink quality monitoring situation or prediction situation of a radio access network, and an uplink and/or downlink quality monitoring situation or prediction situation of a core network.

In an embodiment of this application, communication link quality between vehicles may be quantized into Lc communication link quality levels, where Lc is a function of each second parameter. An expression of the function is not limited in this embodiment of this application, but a value of Lc is correlated with each second parameter. For example, the value of Lc may be positively correlated with communication capabilities of a transmit end vehicle and a receive end vehicle, positively correlated with a frequency bandwidth of an allocated spectrum resource, negatively correlated with a status of interference received, negatively correlated with a distance between vehicles, or the like.

In some embodiments, a relationship between the vehicle of Lc and each second parameter may be shown in Table 1.

TABLE 1

| Communication link quality level | Communication capability of a transmit end vehicle | Communication capability of a receive end vehicle | Frequency bandwidth | Interference situation | Vehicle distance . . . |
|---|---|---|---|---|---|
| 1 | x11 | x12 | x13 | x14 | x15 |
| 2 | x21 | x22 | x23 | x24 | x25 |
| . . . | | | | | |
| Lc | xLc1 | xLc2 | xLc3 | xLc4 | xLc5 |

In the foregoing Table 1, values of parameters corresponding to different communication link quality levels (that is, values of Lc) are not exactly the same, and further, Lc communication link quality levels may be obtained by means of evaluation.

In an embodiment of this application, the sensor sharing dynamic adjustment module may perform hierarchical classification according to content of the sensor data, to obtain Sc sensor data levels. In some embodiments, because the communication link quality is variable, for the sensor data, the sensor data may be divided into a plurality of adjustable levels according to values of first parameters such as importance, resolution (precision), an information format (original data, structured data, and the like), and sharing frequency of the sensor data. A relationship between different sensor data levels and first parameters of the sensor data may be shown in Table 2.

TABLE 2

| Sensor data level | Importance | Resolution | Information format | Sharing frequency | ... |
|---|---|---|---|---|---|
| 1 | y11 | y12 | y13 | y14 | |
| 2 | y21 | y22 | y23 | y24 | |
| ... | | | | | |
| Sc | ySc1 | ySc2 | ySc3 | ySc4 | |

In the foregoing Table 2, values of first parameters of sensor data corresponding to different sensor data levels (that is, values of Sc) are not exactly the same, and further, Sc sensor data levels may be obtained by means of evaluation. Different sensor data levels correspond to different communication link quality levels, and a specific correspondence may be used as a dynamic policy or a preconfigured parameter.

Figure 7:
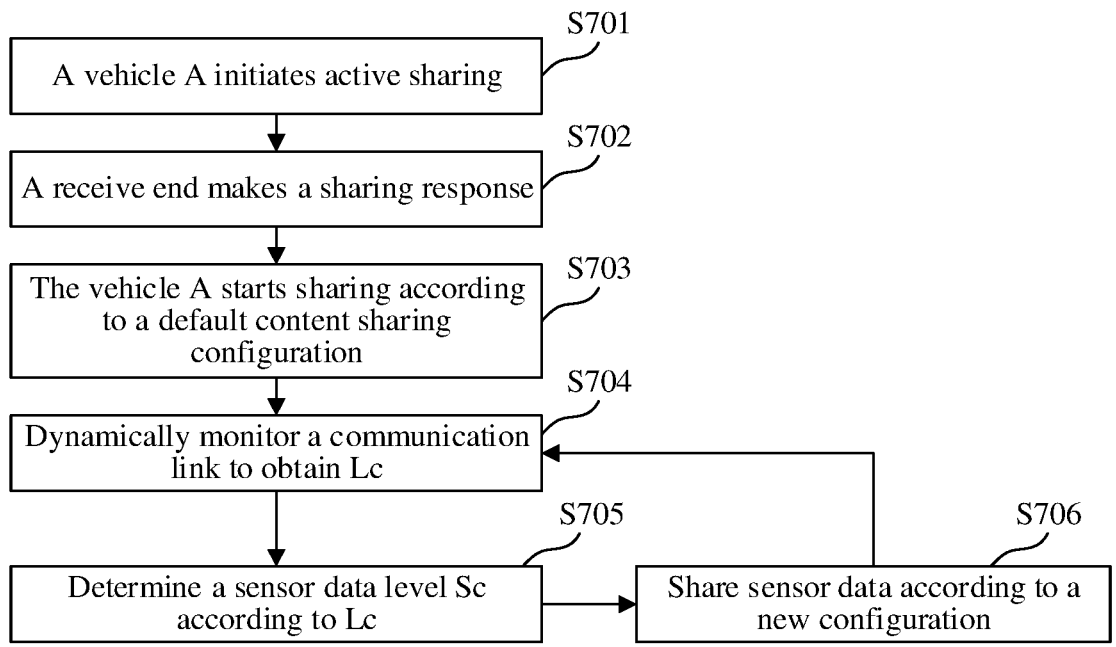
FIG. 7 is a flowchart of a data sharing method between vehicles according to an embodiment of this application.

Based on the technical solution of the foregoing embodiment, as shown in FIG. 7, a data sharing method between vehicles according to an embodiment of this application includes the following steps:

Step S701: A vehicle A initiates an active sharing process of sensor data.

Step S702: A receive end makes a sharing response, that is, replies to the vehicle A with a response message for active sharing. This step belongs to an optional step. In this embodiment of this application, after the vehicle A initiates active sharing, the receive end may not make a sharing response, and the vehicle A directly starts to share the sensor data.

Step S703: The vehicle A starts sharing according to a default content sharing configuration. That is, the vehicle A shares the sensor data according to a default sensor data level at the beginning.

Step S704: The vehicle A dynamically monitors communication link quality with the receive end, to obtain a communication link quality level Lc.

Step S705: Determine, according to the communication link quality level Lc, a sensor data level Sc that matches the communication link quality level Lc.

In some embodiments, if the communication link quality level Lc is relatively high (a higher Lc indicates higher communication link quality), sensor data with a higher sensor data level Sc may be selected (a higher sensor data level Sc indicates more important and/or more sensor data). If the communication link quality level Lc is relatively low, sensor data with a lower sensor data level Sc may be selected.

Step S706: The vehicle A shares the sensor data according to a new configuration (that is, the sensor data level Sc), and returns to step S704 to continue monitoring.

Figure 8:
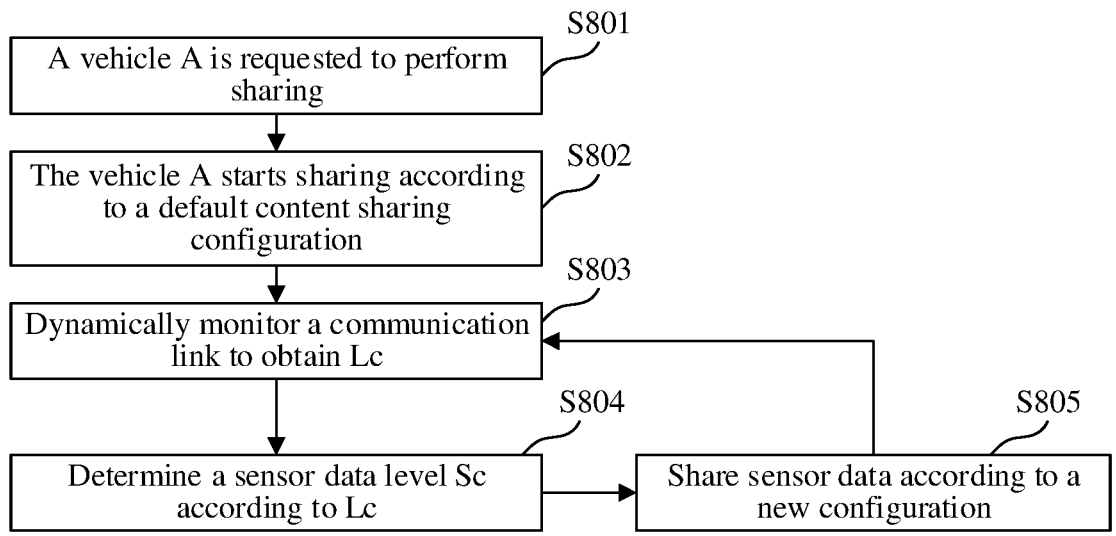
FIG. 8 is a flowchart of a data sharing method between vehicles according to an embodiment of this application.

The technical solution in the embodiment shown in FIG. 7 is a process in which the vehicle A actively initiates sharing. In an embodiment of this application, as shown in FIG. 8, a data sharing method between vehicles according to an embodiment of this application includes the following steps:

Step S801: A vehicle A is requested to share sensor data.

Step S802: The vehicle A starts sharing according to a default content sharing configuration. That is, the vehicle A shares the sensor data according to a default sensor data level at the beginning.

Step S803: The vehicle A dynamically monitors communication link quality with the receive end, to obtain a communication link quality level Lc.

Step S804: Determine, according to the communication link quality level Lc, a sensor data level Sc that matches the communication link quality level Lc.

In some embodiments, if the communication link quality level Lc is relatively high (a higher Lc indicates higher communication link quality), sensor data with a higher sensor data level Sc may be selected (a higher sensor data level Sc indicates more important and/or more sensor data). If the communication link quality level Lc is relatively low, sensor data with a lower sensor data level Sc may be selected.

Step S805: The vehicle A shares the sensor data according to a new configuration (that is, the sensor data level Sc), and returns to step S803 to continue monitoring.

The technical solution in the embodiment shown in FIG. 8 is a process of passive sharing by the vehicle A. That is, the technical solution in the embodiment of this application is not only applicable to an application scenario in which a vehicle actively initiates sensor data sharing, but also applicable to an application scenario in which a vehicle passively shares sensor data.

According to the technical solutions in the foregoing embodiments of this application, during sensor data sharing, communication quality of a data sharing link may be considered between vehicles, so as to adjust quality of the shared sensor data and/or a quantity of the shared sensor data. Therefore, an objective of flexibly adjusting the shared sensor data according to different link communication quality at least to a certain extent is achieved, further coping with a complex and dynamic vehicle communication environment, thereby improving efficiency of sharing sensor data between vehicles, and ensuring driving safety.

The following describes an apparatus embodiment of this application, and may be configured to perform the data sharing method applied between vehicles in the foregoing embodiment of this application. For details that are not disclosed in the apparatus embodiment of this application, refer to the foregoing embodiment of the data sharing method applied between vehicles in this application.

Figure 9:
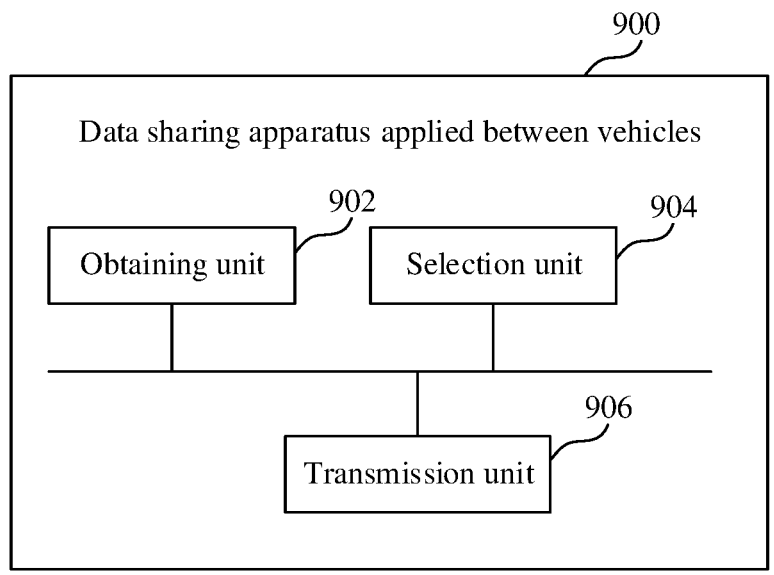
FIG. 9 is a block diagram of a data sharing apparatus applied between vehicles according to an embodiment of this application.

FIG. 9 is a block diagram of a data sharing apparatus applied between vehicles according to an embodiment of this application. The data sharing apparatus may be disposed in a vehicle.

As shown in FIG. 9, a data sharing apparatus 900 applied between vehicles according to an embodiment of this application includes: an obtaining unit 902, a selection unit 904, and a transmission unit 906.

The obtaining unit 902 is configured to obtain communication quality of a data sharing link between a first vehicle and a second vehicle; the selection unit 904 is configured to select, according to the communication quality, a sensor data level that matches the communication quality, the sensor data level being determined by a first parameter in at least one of the following dimensions of sensor data: quality of the sensor data and quantity of the sensor data; and the transmission unit 906 is configured to share, according to the selected sensor data level by using the data sharing link, sensor data corresponding to the sensor data level with the second vehicle.

In some embodiments of this application, based on the foregoing solution, the obtaining unit 902 is configured to: obtain a second parameter of the communication quality of the data sharing link; and perform fitting processing on the second parameter to obtain a network quality level, the network quality level being used for indicating the communication quality of the data sharing link.

In some embodiments of this application, based on the foregoing solution, if the first vehicle communicates with the second vehicle by using a PC5 communication resource pool mode, the second parameter includes at least one of the following: communication capabilities of the first vehicle and the second vehicle, a communication frequency band that can be used between the first vehicle and the second vehicle, an interference degree of the data sharing link, and a vehicle distance between the first vehicle and the second vehicle.

In some embodiments of this application, based on the foregoing solution, if the first vehicle communicates with the second vehicle by using a PC5 resource scheduling mode, the second parameter includes at least one of the following: communication capabilities of the first vehicle and the second vehicle, a communication frequency band that can be used between the first vehicle and the second vehicle, an interference degree of the data sharing link, a vehicle distance between the first vehicle and the second vehicle, quality monitoring information of a PC5 communication link, and quality prediction information of the PC5 communication link.

In some embodiments of this application, based on the foregoing solution, if the first vehicle communicates with the second vehicle by using a mobile communication network, the second parameter includes at least one of the following: communication link quality monitoring information on a radio access network side, communication link quality prediction information on the radio access network side, communication link quality monitoring information on a core network side, and communication link quality prediction information on the core network side.

In some embodiments of this application, based on the foregoing solution, where the second parameter includes communication capabilities of the first vehicle and the second vehicle, the network quality level is in a positive correlation with the communication capability.

In some embodiments of this application, based on the foregoing solution, where the second parameter includes a communication frequency band that can be used between the first vehicle and the second vehicle, the network quality level is in a positive correlation with a bandwidth of the communication frequency band.

In some embodiments of this application, based on the foregoing solution, where the second parameter includes an interference degree of the data sharing link, the network quality level is in an inverse correlation with the interference degree.

In some embodiments of this application, based on the foregoing solution, where the second parameter includes a vehicle distance between the first vehicle and the second vehicle, the network quality level is in an inverse correlation with the vehicle distance.

In some embodiments of this application, based on the foregoing solution, the data sharing apparatus 900 further includes: a generation unit, configured to: before selecting, according to the communication quality, the sensor data level that matches the communication quality, generate a plurality of sensor data levels according to the first parameter in at least one dimension of the quality of the sensor data and the quantity of the sensor data, dimension categories corresponding to different sensor data levels being not exactly the same as the first parameters in the dimensions.

In some embodiments of this application, based on the foregoing solution, the first parameter in the dimension corresponding to the quality of the sensor data includes at least one of the following: content importance of the sensor data, precision of the sensor data, and an information format of the sensor data; and the first parameter in the dimension corresponding to the quantity of sensor data includes: sharing frequency of the sensor data.

In some embodiments of this application, based on the foregoing solution, the data sharing apparatus 900 further includes: a first transmitting unit, configured to: before the obtaining unit obtains the communication quality of the data sharing link between the first vehicle and the second vehicle, initiate sensor data sharing indication information to the second vehicle, and share the sensor data with the second vehicle after transmitting the sensor data sharing indication information; and the obtaining unit 902 is configured to: detect the communication quality of the data sharing link between the first vehicle and the second vehicle in a process of sharing the sensor data with the second vehicle.

In some embodiments of this application, based on the foregoing solution, the data sharing apparatus 900 further includes: a second transmitting unit, configured to: before the communication quality of the data sharing link between the first vehicle and the second vehicle is obtained, share the sensor data with the second vehicle in response to a sensor data sharing request transmitted by the second vehicle; and the obtaining unit 902 is configured to: detect the communication quality of the data sharing link between the first vehicle and the second vehicle in a process of sharing the sensor data with the second vehicle.

In some embodiments of this application, based on the foregoing solution, the transmission unit 906 is configured to: adjust, according to the selected sensor data level, the sensor data shared with the second vehicle by using the data sharing link.

In some embodiments of this application, based on the foregoing solution, the obtaining unit 902 is configured to: obtain monitored communication quality of the data sharing link between the first vehicle and the second vehicle; or obtain predicted communication quality of the data sharing link between the first vehicle and the second vehicle.

Figure 10:
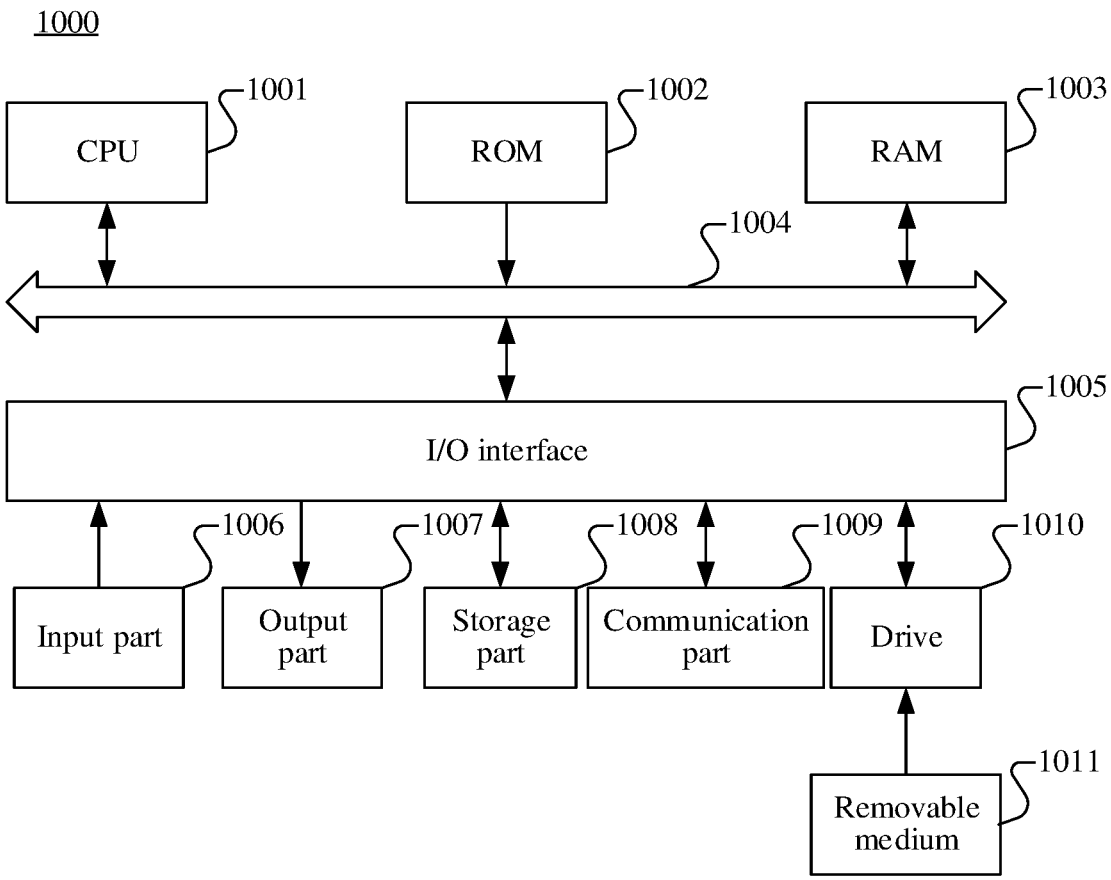
FIG. 10 is a schematic structural diagram of a computer system adapted to implement an electronic device according to an embodiment of this application.

FIG. 10 is a schematic structural diagram of a computer system adapted to implement an electronic device according to an embodiment of this application.

A computer system 1000 of the electronic device shown in FIG. 10 is merely an example, and does not constitute any limitation on functions and use ranges of the embodiments of this application.

As shown in FIG. 10, the computer system 1000 includes a central processing unit (CPU) 1001, which may perform various suitable actions and processing based on a program stored in a read-only memory (ROM) 1002 or a program loaded from a storage part 1008 into a random access memory (RAM) 1003, for example, perform the method described in the foregoing embodiments. The RAM 1003 further stores various programs and data required for operating the system. The CPU 1001, the ROM 1002, and the RAM 1003 are connected to each other through a bus 1004. An input/output (I/O) interface 1005 is also connected to the bus 1004.

The following components are connected to the I/O interface 1005: an input part 1006 including a keyboard, a mouse, and the like; an output part 1007 including, for example, a cathode ray tube (CRT), a liquid crystal display (LCD), a speaker, and the like; a storage part 1008 including a hard disk and the like; and a communication part 1009 including a network interface card such as a local area network (LAN) card or a modem. The communication part 1009 performs communication processing by using a network such as the Internet. A driver 1010 is also connected to the I/O interface 1005 as required. A removable medium 1011, such as a magnetic disk, an optical disc, a magneto-optical disk, or a semiconductor memory, is installed on the drive 1010 as required, so that a computer program read from the removable medium is installed into the storage part 1008 as required.

Particularly, according to an embodiment of this application, the processes described in the following by referring to the flowcharts may be implemented as computer software programs. For example, an embodiment of this application includes a computer program product. The computer program product includes a computer program stored in a computer readable medium. The computer program includes a computer program used for performing a method shown in the flowchart. In such an embodiment, by using the communication part 1009, the computer program may be downloaded and installed from a network, and/or installed from the removable medium 1011. When the computer program is executed by the CPU 1001, the various functions defined in the system of this application are executed.

The computer readable medium shown in the embodiments of this application may be a computer readable signal medium or a computer readable storage medium or any combination of the two. The computer readable storage medium may be, for example, but is not limited to, an electric, magnetic, optical, electromagnetic, infrared, or semi-conductive system, apparatus, or component, or any combination of the above. A more specific example of the computer readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this application, the computer readable storage medium may be any tangible medium containing or storing a program, and the program may be used by or used in combination with an instruction execution system, an apparatus, or a device. In this application, the computer readable signal medium may include a data signal transmitted in a baseband or as part of a carrier, and stores a computer readable computer program. A data signal propagated in such a way may assume a plurality of forms, including, but not limited to, an electromagnetic signal, an optical signal, or any appropriate combination thereof. The computer readable signal medium may be further any computer readable medium in addition to a computer readable storage medium. The computer readable medium may transmit, propagate, or transmit a program that is used by or used in conjunction with an instruction execution system, an apparatus, or a device. A computer program included in the computer readable medium may be transmitted by using any appropriate medium, including but not limited to: wireless, wired, or the like, or any suitable combination of the foregoing.

The flowcharts and block diagrams in the accompanying drawings illustrate possible system architectures, functions and operations that may be implemented by a system, a method, and a computer program product according to various embodiments of this application. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in the accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of this application may be implemented in a software manner, or may be implemented in a hardware manner, and the unit described can also be set in a processor. Names of the units do not constitute a limitation on the units in a specific case.

In another aspect, this application further provides a computer readable medium, where the computer readable medium may be included in the electronic device described in the foregoing embodiment. The computer readable medium may alternatively exist separately and not be assembled into the electronic device. The computer readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this application, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this application.

After considering the specification and practicing the implementations of the present disclosure, a person skilled in the art may easily conceive of other implementations of this application. This application is intended to cover any variations, uses, or adaptations of this application. These variations, uses, or adaptations follow the general principles of this application and include common knowledge or conventional technical means in the art that are not disclosed in this application.

It is to be understood that this application is not limited to the precise structures described above and shown in the accompanying drawings, and various modifications and changes can be made without departing from the scope of this application. The scope of this application is limited only by the appended claims.

What is claimed is:

1. A data sharing method applied between vehicles, comprising:
obtaining a communication quality of a data sharing link between a first vehicle and a second vehicle;
selecting, according to the communication quality, a sensor data level that matches the communication quality, the sensor data level being determined by at least one first parameter in at least one dimension of a plurality of dimensions of sensor data, the plurality of dimensions of sensor data comprising: a quality of the sensor data and a quantity of the sensor data, wherein the at least one dimension comprises at least the quantity of the sensor data, the at least one parameter in the quantity of the sensor data comprises a sharing frequency of the sensor data between the first vehicle and the second vehicle;
adjusting the sharing frequency by: increasing the sharing frequency when the selected sensor data level increases and decreasing the sharing frequency when the selected sensor data level decreases; and
sharing, according to the selected sensor data level and the adjusted sharing frequency by using the data sharing link, the sensor data corresponding to the sensor data level with the second vehicle.

2. The data sharing method according to claim 1, wherein the obtaining the communication quality of the data sharing link between the first vehicle and the second vehicle comprises:
obtaining a second parameter of the communication quality of the data sharing link; and
performing fitting processing on the second parameter to obtain a network quality level, the network quality level used to indicate the communication quality of the data sharing link.

3. The data sharing method according to claim 2, wherein when the first vehicle communicates with the second vehicle using a PC5 communication resource pool mode, the second parameter comprises at least one:
communication capabilities of the first vehicle and the second vehicle, a communication frequency band used between the first vehicle and the second vehicle, an interference degree of the data sharing link, or a vehicle distance between the first vehicle and the second vehicle.

4. The data sharing method according to claim 2, wherein when the first vehicle communicates with the second vehicle using a PC5 resource scheduling mode, the second parameter comprises at least one:
communication capabilities of the first vehicle and the second vehicle, a communication frequency band used between the first vehicle and the second vehicle, an interference degree of the data sharing link, a vehicle distance between the first vehicle and the second vehicle, quality monitoring information of a PC5 communication link, or quality prediction information of the PC5 communication link.

5. The data sharing method according to claim 2, wherein when the first vehicle communicates with the second vehicle using a mobile communication network, the second parameter comprises at least one of:
communication link quality monitoring information on a radio access network side, communication link quality prediction information on the radio access network side, communication link quality monitoring information on a core network side, or communication link quality prediction information on the core network side.

6. The data sharing method according to claim 2, wherein:
when the second parameter comprises communication capabilities of the first vehicle and the second vehicle, the network quality level is in a positive correlation with the communication capability;
when the second parameter comprises a communication frequency band used between the first vehicle and the second vehicle, the network quality level is in a positive correlation with a bandwidth of the communication frequency band;
when the second parameter comprises an interference degree of the data sharing link, the network quality level is in an inverse correlation with the interference degree; and
when the second parameter comprises a vehicle distance between the first vehicle and the second vehicle, the network quality level is in an inverse correlation with the vehicle distance.

7. The data sharing method according to claim 1, wherein before the selecting, according to the communication quality, the sensor data level that matches the communication quality, the data sharing method further comprises:
generating a plurality of sensor data levels according to the at least one first parameter.

8. The data sharing method according to claim 7, wherein:
the at least one dimension further comprises the quality of the sensor data, the quality of the sensor data comprising at least one of: a content importance of the sensor data, a precision of the sensor data, or an information format of the sensor data.

9. The data sharing method according to claim 1, wherein before the obtaining the communication quality of the data sharing link between the first vehicle and the second vehicle, the data sharing method further comprises: initiating sensor data sharing indication information to the second vehicle, and sharing the sensor data with the second vehicle after transmitting the sensor data sharing indication information,
wherein the obtaining the communication quality of the data sharing link between the first vehicle and the second vehicle comprises: detecting the communication quality of the data sharing link between the first vehicle and the second vehicle while sharing the sensor data with the second vehicle.

10. The data sharing method according to claim 1, wherein before the obtaining the communication quality of the data sharing link between the first vehicle and the second vehicle, the data sharing method further comprises: sharing the sensor data with the second vehicle in response to a sensor data sharing request transmitted by the second vehicle, wherein the obtaining the communication quality of the data sharing link between the first vehicle and the second vehicle comprises: detecting the communication quality of the data sharing link between the first vehicle and the second vehicle while sharing the sensor data with the second vehicle.

11. The data sharing method according to claim 1, wherein the obtaining the communication quality of the data sharing link between the first vehicle and the second vehicle comprises:
    obtaining a monitored communication quality of the data sharing link between the first vehicle and the second vehicle; or
    obtaining a predicted communication quality of the data sharing link between the first vehicle and the second vehicle.

12. A data sharing apparatus applied between vehicles, comprising:
    a memory storing a plurality of instructions; and
    a processor configured to execute the plurality of instructions, wherein upon execution of the plurality of instructions, the processor is configured to:
        obtain a communication quality of a data sharing link between a first vehicle and a second vehicle;
        select, according to the communication quality, a sensor data level that matches the communication quality, the sensor data level being determined by at least one first parameter in at least one dimension of a plurality of dimensions of sensor data, the plurality of dimensions of sensor data comprising: a quality of the sensor data and a quantity of the sensor data, wherein the at least one dimension comprises at least the quantity of the sensor data, the at least one parameter in the quantity of the sensor data comprises a sharing frequency of the sensor data between the first vehicle and the second vehicle;
        adjust the sharing frequency by: increasing the sharing frequency when the selected sensor data level increases and decreasing the sharing frequency when the selected sensor data level decreases; and
        share, according to the selected sensor data level and the adjusted sharing frequency by using the data sharing link, the sensor data corresponding to the sensor data level with the second vehicle.

13. The apparatus according to claim 12, wherein in order to obtain the communication quality of the data sharing link between the first vehicle and the second vehicle, the processor, upon execution of the plurality of instructions, is configured to:
    obtain a second parameter of the communication quality of the data sharing link; and
    perform fitting processing on the second parameter to obtain a network quality level, the network quality level being used to indicate the communication quality of the data sharing link.

14. The apparatus according to claim 12, wherein the processor, upon execution of the plurality of instructions, is further configured to:
    before selecting, according to the communication quality, the sensor data level that matches the communication quality, generate a plurality of sensor data levels according to the at least one first parameter.

15. The apparatus according to claim 12, wherein before obtaining the communication quality of the data sharing link between the first vehicle and the second vehicle, the processor, upon execution of the plurality of instructions, is configured to initiate sensor data sharing indication information to the second vehicle, and share the sensor data with the second vehicle after transmission of the sensor data sharing indication information,
    wherein in order to obtain the communication quality of the data sharing link between the first vehicle and the second vehicle comprises, the processor, upon execution of the plurality of instructions, is configured to detect the communication quality of the data sharing link between the first vehicle and the second vehicle while sharing the sensor data with the second vehicle.

16. The apparatus according to claim 12, wherein before the obtaining the communication quality of the data sharing link between the first vehicle and the second vehicle, the processor, upon execution of the plurality of instructions, is configured to: share the sensor data with the second vehicle in response to a sensor data sharing request transmitted by the second vehicle,
    wherein in order to obtain the communication quality of the data sharing link between the first vehicle and the second vehicle, the processor, upon execution of the plurality of instructions, is configured to detect the communication quality of the data sharing link between the first vehicle and the second vehicle while sharing the sensor data with the second vehicle.

17. The apparatus according to claim 12, wherein in order to obtain the communication quality of the data sharing link between the first vehicle and the second vehicle, the processor, upon execution of the plurality of instructions, is configured to:
    obtain a monitored communication quality of the data sharing link between the first vehicle and the second vehicle; or
    obtain a predicted communication quality of the data sharing link between the first vehicle and the second vehicle.

18. A non-transitory computer readable storage medium, storing a computer program executable by a processor, wherein when executed by the processor, the computer program is configured to cause the processor to:
    obtain a communication quality of a data sharing link between a first vehicle and a second vehicle;
    select, according to the communication quality, a sensor data level that matches the communication quality, the sensor data level being determined by at least one first parameter in at least one dimension of a plurality of dimensions of sensor data, the plurality of dimensions of sensor data comprising: a quality of the sensor data and a quantity of the sensor data, wherein the at least one dimension comprises at least the quantity of the sensor data, the at least one parameter in the quantity of the sensor data comprises a sharing frequency of the sensor data between the first vehicle and the second vehicle;
    adjust the sharing frequency by: increasing the sharing frequency when the selected sensor data level increases and decreasing the sharing frequency when the selected sensor data level decreases; and
    share, according to the selected sensor data level by using the data sharing link, the sensor data corresponding to the sensor data level with the second vehicle.

19. The non-transitory computer readable storage medium according to claim 18, wherein in order to obtain the communication quality of the data sharing link between the first vehicle and the second vehicle, the computer program, when executed by the processor, is configured to cause the processor to:

obtain a second parameter of the communication quality of the data sharing link; and perform fitting processing on the second parameter to obtain a network quality level, the network quality level being used to indicate the communication quality of the data sharing link.

\* \* \* \* \*